United States Patent
Stengelin et al.

(10) Patent No.: US 8,372,553 B2
(45) Date of Patent: Feb. 12, 2013

(54) FUEL CELL VOLTAGE UNIT FOR DETECTING A FAILED PLATE CONNECTION

(75) Inventors: Hartmut Stengelin, Mainz (DE);
Bernhard Baaser, Milford, MI (US);
Robert S. Foley, Rochester, NY (US);
Michael F. Zawisa, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2246 days.

(21) Appl. No.: 11/397,199

(22) Filed: Apr. 4, 2006

(65) Prior Publication Data
US 2007/0231642 A1    Oct. 4, 2007

(51) Int. Cl.
*H01M 8/04* (2006.01)
(52) U.S. Cl. .................. 429/432; 429/428; 429/430
(58) Field of Classification Search .......... 429/428, 429/430, 432
See application file for complete search history.

(56) References Cited

U.S. PATENT DOCUMENTS

| | | | | |
|---|---|---|---|---|
| 5,156,928 A | * | 10/1992 | Takabayashi | 429/23 |
| 5,346,778 A | * | 9/1994 | Ewan et al. | 429/19 |
| 6,140,820 A | * | 10/2000 | James | 324/434 |
| 2002/0180447 A1 | * | 12/2002 | Masse et al. | 324/433 |

* cited by examiner

*Primary Examiner* — Ula C Ruddock
*Assistant Examiner* — Patricia Davis
(74) *Attorney, Agent, or Firm* — John A. Miller; Miller IP Group, PLC

(57) ABSTRACT

A fuel cell system that includes a cell voltage monitoring sub-system that measures the cell voltage of each cell in a fuel cell stack and provides an indication of a low performing or failed cell. The fuel cell system uses the cell voltage monitoring sub-system to determine if one of the wires connected to a bipolar plate in the stack is broken or has otherwise failed. The cell voltage monitoring sub-system uses differential amplifiers to compare the positive side voltage and the negative side voltage of a cell to determine if the cell voltage is low or the cell is failing. By looking at the outputs of two differential amplifiers in the cell voltage monitoring sub-system, it can be determined whether adjacent cells provide an indication of both cells failing, which would indicate that a connection wire has failed.

13 Claims, 6 Drawing Sheets

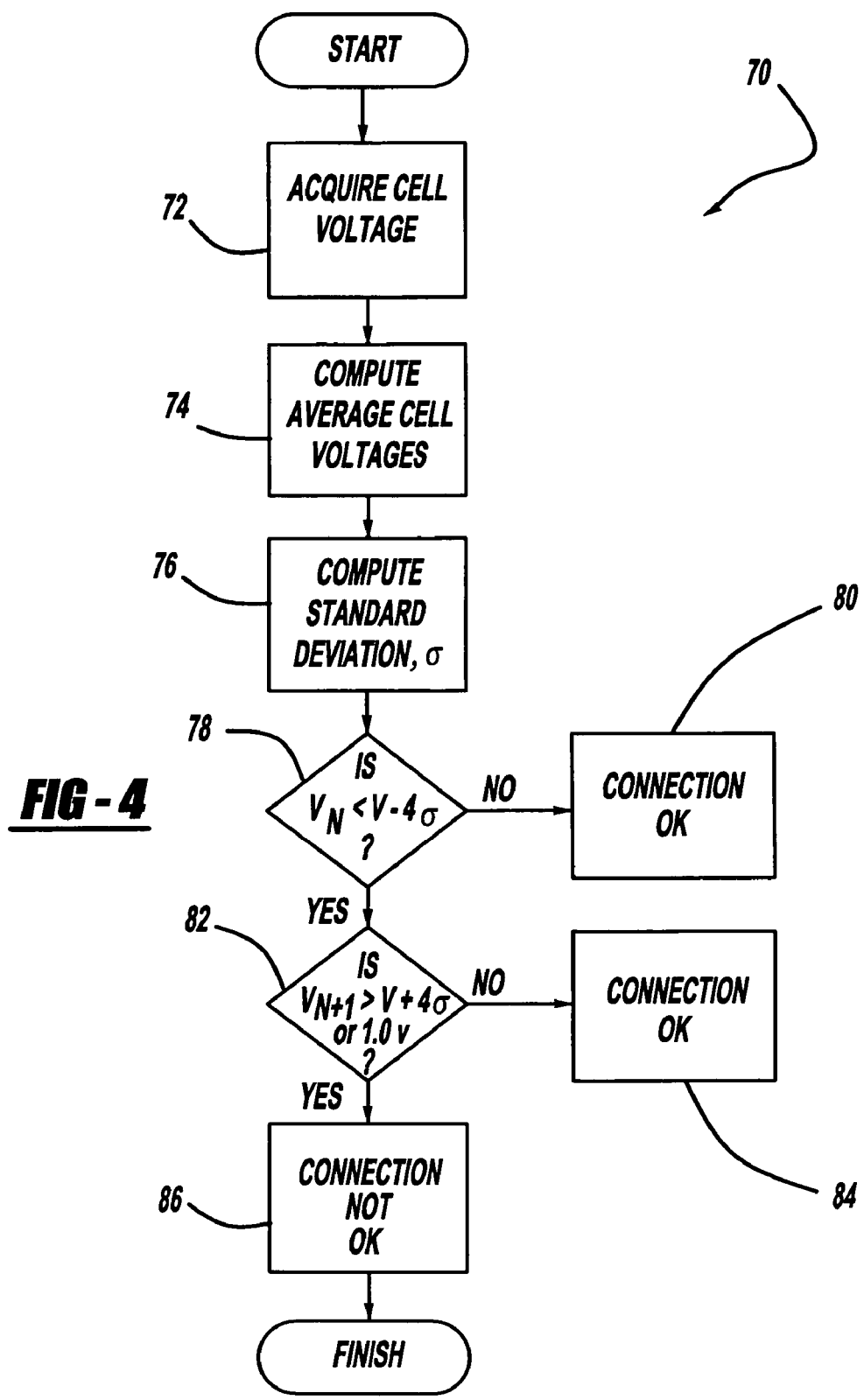

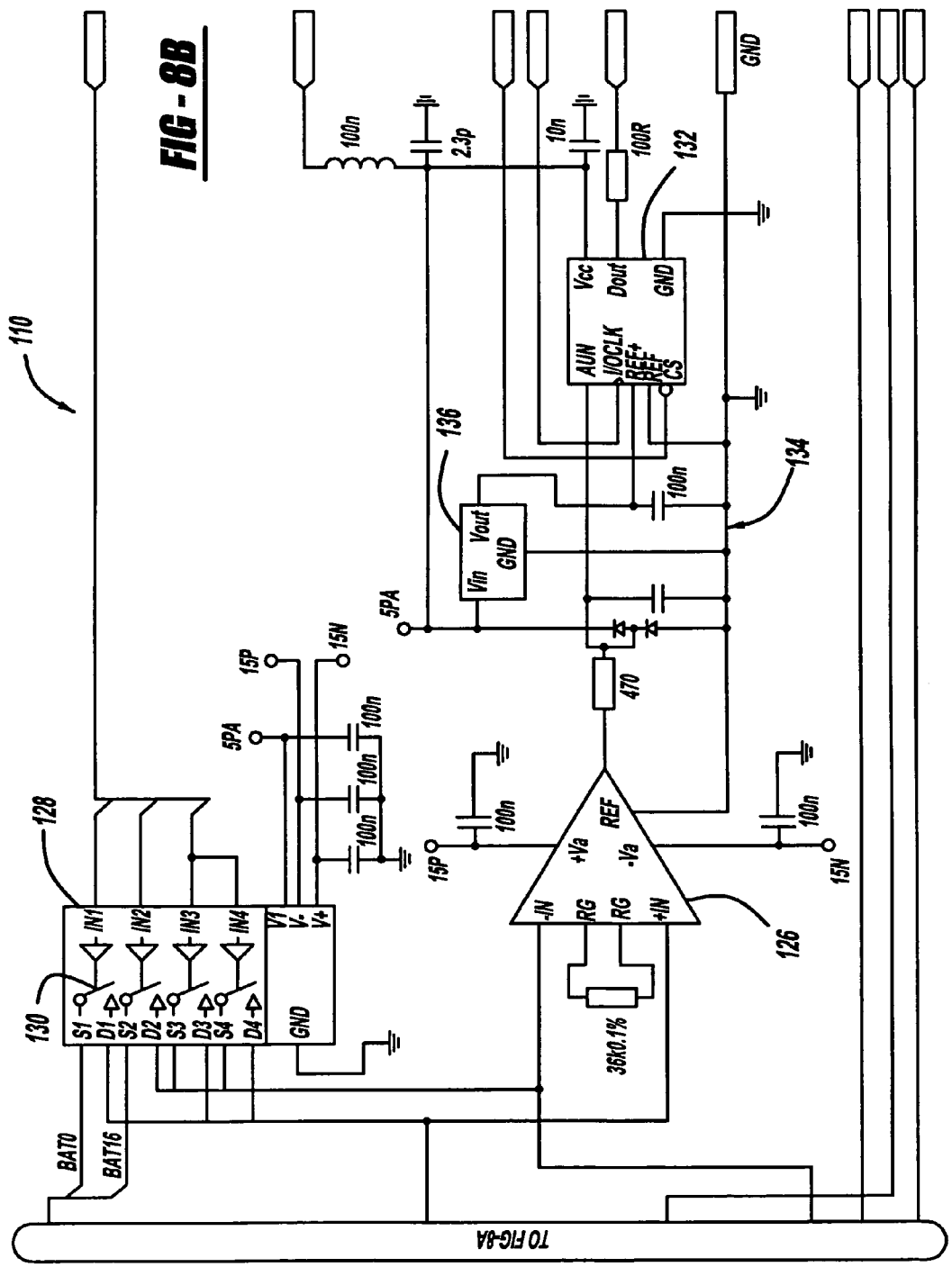

FUEL CELL VOLTAGE UNIT FOR DETECTING A FAILED PLATE CONNECTION

BACKGROUND OF THE INVENTION

1. Field of the Invention

This invention relates generally to a fuel cell system that includes an algorithm for determining whether a plate connection has failed and, more particularly, to a fuel system that uses a cell voltage monitoring sub-system typically used to determine whether a fuel cell in a fuel cell stack is failing to determine whether a connection wire for measuring the voltage potential of a fuel cell has failed.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. The bipolar plates are made of an electrically conductive material, such as stainless steel, so that they conduct the electricity generated by the fuel cells out of the stack. The bipolar plates also include flow channels through which a cooling fluid flows.

Typically, the voltage output of every fuel cell in the fuel cell stack is monitored to determine its output voltage so that the system knows if a fuel cell voltage is too low, indicating a possible failure. As is understood in the art, because all of the fuel cells are electrically coupled in series, if one fuel cell in the stack fails, then the entire stack will fail. Certain remedial actions can be taken for a failing fuel cell as a temporary solution until the vehicle can be serviced, such as increasing the flow of hydrogen and/or increasing the cathode stoichiometry.

The fuel cell voltages are measured by a cell voltage monitoring sub-system that includes a wire connected to each bipolar plate in the stack and end plates of the stack to measure a voltage potential between the positive and negative sides of each cell. Therefore, a 400 cell stack will include 401 wires connected to the stack.

FIG. 1 is a plan view of a fuel cell system 10 including a fuel cell stack 12 and a cell voltage monitoring sub-system 14. The fuel cell stack 12 includes terminals 16 and 18 at each end of the stack 12 that provide connection locations for the electrical power from the stack 12. The fuel cell stack 12 also includes a series of fuel cells 20 defined by MEAs 22 positioned between bipolar plates 24. The bipolar plates 24 include flow channels for the cathode side of one fuel cell 20 and the anode side of an adjacent fuel cell 20, as discussed above.

The cell voltage monitoring sub-system 14 includes electrical wires 28 where a separate wire 28 is electrically coupled to each bipolar plate 24. The electrical wires 28 for the bipolar plates 24 on opposite sides of an MEA 22 are coupled to the positive and negative input terminals of a differential amplifier 30. The voltage of the cells 20 is measured by subtracting the cells negative plate voltage from the cells positive plate voltage in the amplifier 30, where an output voltage $V_N$ indicates the voltage of each cell 20. There are many techniques known in the art for providing this measurement, for example, analog multiplexing.

Because there are so many wires 28 connected to the stack 12, the potential for one of the wires 24 breaking or becoming disconnected from the bipolar plate 24 is a real concern. If one of the wires 28 or plate connections does fail, then the output of the known cell monitoring sub-system provides an indication of a failed cell. However, it would be desirable to distinguish between a low voltage cell and a failed plate connection because the fuel cell system 10 will still operate with a failed plate connection, and it subsequently can be conveniently repaired.

SUMMARY OF THE INVENTION

In accordance with the teachings of the present invention, a fuel cell system is disclosed that includes a cell voltage monitoring sub-system that measures the cell voltage of each cell in a fuel cell stack and provides an indication of a low performing or failed cell. The fuel cell system uses the cell voltage monitoring sub-system to determine if one of the wires connected to a bipolar plate in the stack is broken or the plate connection has otherwise failed.

In one embodiment, the cell voltage monitoring sub-system uses differential amplifiers to compare the positive side voltage and the negative side voltage of a cell to determine if the cell voltage is low or the cell is failing. Because each bipolar plate in a stack is a positive side of one fuel cell and a negative side of an adjacent fuel cell, a failed wire will have a voltage effect on both cells, not just one of the cells. By looking at the outputs of two differential amplifiers in the cell voltage monitoring sub-system, it can be determined whether adjacent cells provide an indication of both cells failing, which would indicate that a connection wire has failed.

In an alternate embodiment, the cell voltage monitoring sub-system includes two multiplexers and a single differential amplifier. The multiplexers are switched so that the outputs of two adjacent plates are provided to the input of the differential amplifier to provide a voltage reading for a fuel cell. The cell voltage monitoring sub-system includes an unloading device that dissipates a capacitance in the differential amplifier between each voltage measurement so that an accurate voltage reading is taken from the plate if a plate connection is failing.

Additional features of the present invention will become apparent from the following description and appended claims, taken in conjunction with the accompanying drawings.

BRIEF DESCRIPTION OF THE DRAWINGS

FIG. 4 is a flow chart diagram showing a process for detecting a failed plate connection, according to an embodiment of the present invention;

FIGS. 8A and 8B are schematic diagrams of a cell voltage unit, according to an embodiment of the present invention.

DETAILED DESCRIPTION OF THE EMBODIMENTS

Figure 1:
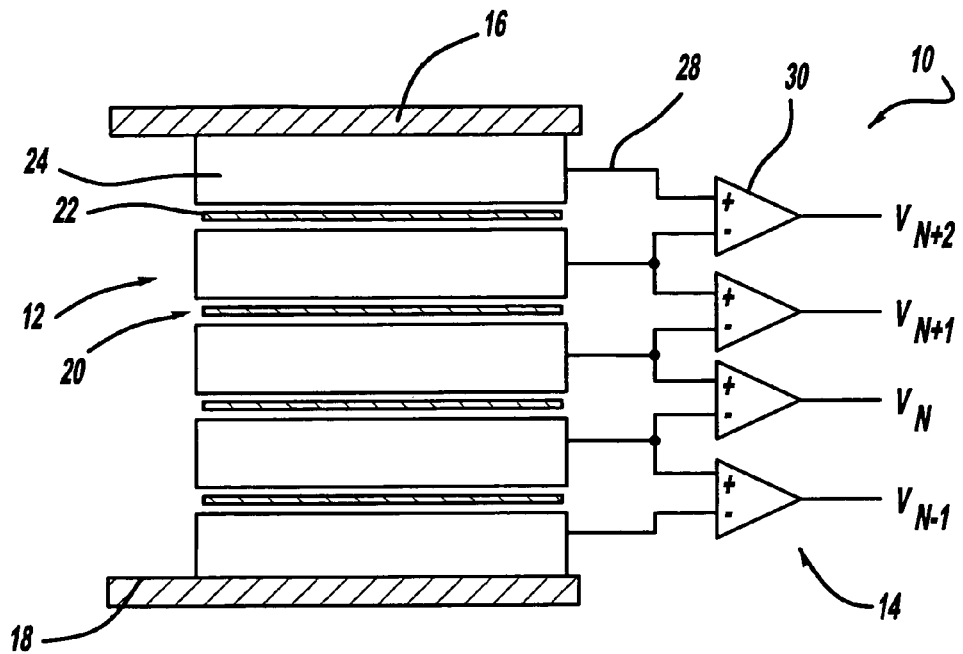
FIG. 1 is a plan view of a fuel cell system including a cell voltage monitoring sub-system.

The following discussion of the embodiments of the invention directed to a system and method for determining if an electrical connection to a bipolar plate in a fuel cell stack has failed is merely exemplary in nature, and is in no way intended to limit the invention or its applications or uses.

As discussed above, the outputs of the differential amplifiers 30 provide a voltage $V_N$ that indicates the voltage of a particular fuel cell 20. It is that voltage that is monitored to identify which fuel cell 20 may have a low voltage, and is possibly failing. However, as is apparent, each wire 28 connected to the bipolar plates 24 is also connected to the positive terminal of one differential amplifier 30 and a negative terminal and an adjacent differential amplifier 30. Therefore, if a particular wire 28 is broken, becomes loose or otherwise fails, a voltage change will occur at the output of two of the differential amplifiers 30, instead of only one of the differential amplifiers 30 for a failing cell 20.

Figure 2:
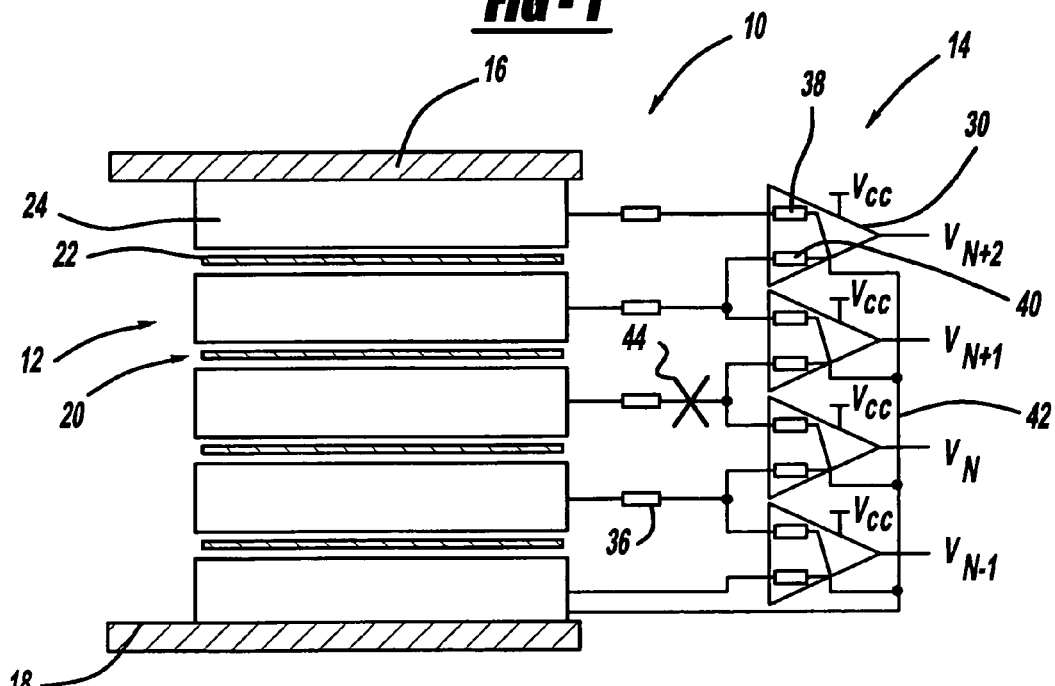
FIG. 2 is a plan view of the fuel cell system shown in FIG. 1 including leakage impedances.

FIG. 2 is another plan view of the fuel cell system 10 including representative impedances in the wires 28 and the differential amplifiers 30 to help illustrate this principle. Particularly, each of the wires 28 includes a connection impedance 36 and each of the differential amplifiers 30 include leakage impedances 38 and 40 at their non-inverting and inverting inputs. Line 42 is a ground line. The connection impedance 36 is usually relatively small if the wire 28 is connected properly. If a wire 28 breaks, the connection impedance 36 goes high, which is voltage divided with the leakage impedance 38 or 40. When the leakage impedances 38 and 40 are large compared to the connection impedance 36, the voltage at the input of the differential amplifiers 30 will fall close to ground, providing a characteristic voltage signal for both of the cells 20 sharing that connection. The leakage impedances 38 and 40 will tend to pull the output voltage $V_N$ of the differential amplifier 30 to ground if the wire 28 connected to the particular input of the differential amplifier 30 breaks or the connection otherwise fails.

For example, if the wire 44 breaks, the positive terminal and the leakage impedance 38 of the differential amplifier 30 having output voltage $V_N$ will be affected and the negative terminal and the leakage impedance 40 of the differential amplifier 30 having output voltage $V_{N+1}$ will be affected. Particularly, the output voltage $V_N$ will become zero or negative because the leakage impedance 38 pulls the positive terminal of that differential amplifier 30 to ground and the negative terminal of that differential amplifier 30 is negative relative thereto because its wire 28 has not failed. The opposite effect occurs for the differential amplifier 30 having the output voltage $V_{N+1}$ because the negative terminal of that differential amplifier 30 will be pulled to ground and the positive terminal will have a positive voltage, so that the output voltage $V_{N+1}$ will go to the positive potential of the amplifier's power supply. Therefore, the voltage $V_N$ will be zero or negative and the voltage $V_{N+1}$ will be at the positive rail of the differential amplifier 30.

Figure 3:
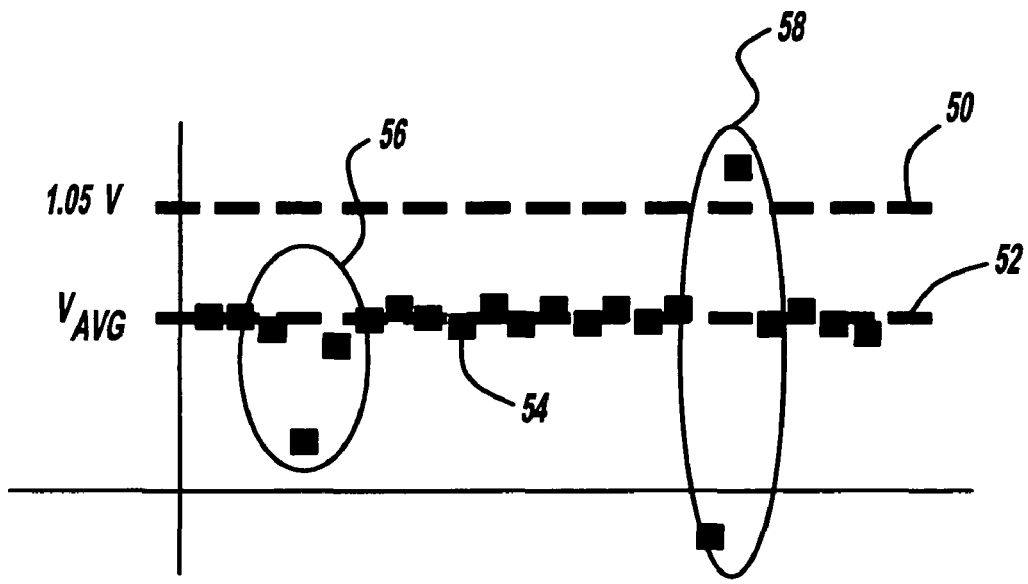
FIG. 3 is a graph with voltage on the vertical axis and cell number on the horizontal axis showing the difference between a low performing cell and a failed plate connection.

FIG. 3 is a graph with cell number on the horizontal axis and voltage on the vertical axis. Line 50 represents the maximum voltage potential of the cells 20 and line 52 represents an average voltage potential of the cells 20. Each dot 54 represents a particular cell output voltage. Two locations 56 and 58 are identified to distinguish a low performing cell and a failed plate connection. Particularly, the location 56 shows that the fourth cell has an output voltage near zero, and represents that the fourth cell is a low performing cell. At the location 58, one cell 20 has an output voltage at or near zero and an adjacent cell 20 has an output voltage at about the maximum voltage indicating a failed connection. Therefore, an algorithm can be provided that will look for this type of pattern where adjacent cell voltages V will provide the pattern as shown at the location 58. Alternately, the high voltage potential can be first and the low voltage potential can be second depending on how the cells are connected.

FIG. 4 is a flow chart diagram 70 showing a process for determining if there is a failed plate connection, according to an embodiment of the present invention. The algorithm first acquires all of the measured cell voltages $V_N$ at box 72. The algorithm then computes an average cell voltage from all of the measured cell voltages $V_N$ at box 74. The algorithm then computes a standard deviation σ of all of the measured cell voltages V at box 76. The algorithm then determines if the output voltage $V_N$ of each differential amplifier 30 is less than four times the standard deviation σ at decision diamond 78. Using the value of four times the standard deviation σ is a non-limiting example in that other values can also be used. If none of the cell voltages $V_N$ are less than four standard deviations σ at the decision diamond 78, then there is no low performing cell and all of the connections are good at box 80. If one of the cell voltages $V_N$ is less than four standard deviations σ at the decision diamond 78, then one of the cells may be a low performing cell or one of the connections may be bad.

The algorithm then determines if an adjacent cell voltage $V_N$ is greater than four standard deviations σ or at a maximum voltage potential at decision diamond 82. If the adjacent cell voltage $V_N$ is not greater than four deviations σ of the average cell voltage or at a maximum voltage at the decision diamond 82, then there is not a bad connection at box 84, but there is a low performing cell. If the adjacent cell voltage $V_N$ is at the maximum voltage or is greater than four standard deviations σ, then the algorithm determines that there is a bad connection at box 86. The algorithm goes through the entire list of the cells 20 in this manner to determine a low performing cell or a connection failure, and then returns to computing the average cell voltage and the standard deviation σ at the boxes 72, 74 and 76. If the cells 20 are wired differently, or the algorithm sequences in the opposite direction, then it will first determine if a cell voltage $V_N$ is greater than four standard deviations σ or at the maximum voltage, and then determine whether the cell voltage is less than four standard deviations σ.

Figure 5:
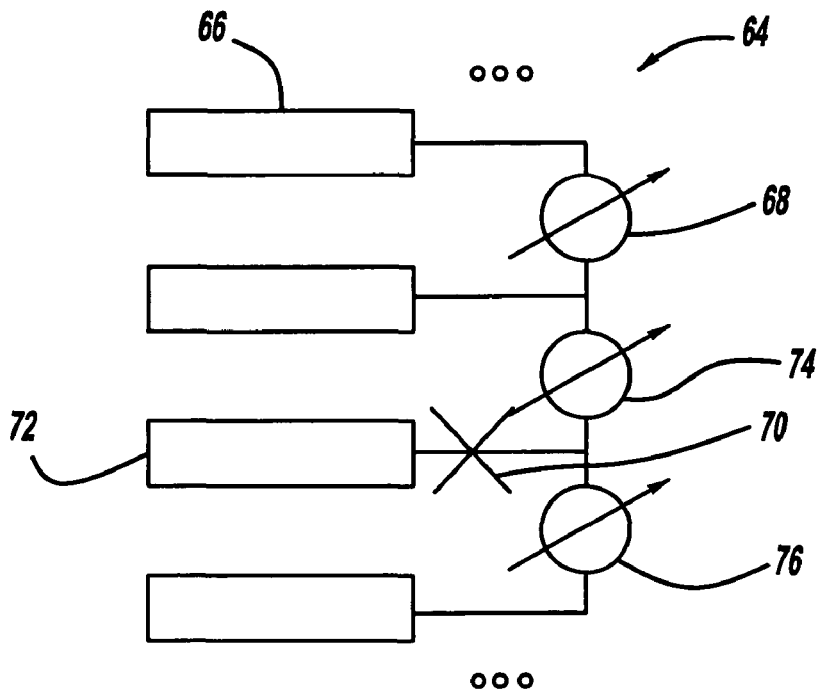
FIG. 5 is a plan view of part of a fuel cell stack showing voltage meters for measuring fuel cell voltage potentials.

FIG. 5 is a plan view of part of a fuel cell stack 64 including stack plates 66 separating the fuel cells in the stack 64. In this embodiment, the voltage potential across a fuel cell in the stack 64 is measured by a voltage meter 68 where a wire is connected to a plate 66 at one side of the fuel cell and one terminal of the voltage meter 68 and another wire is connected to an opposing plate at the other side of the fuel cell and the other terminal of the voltage meter 68. Further, one wire is connected to a positive terminal of one of the voltage meters 68 and a negative terminal of an adjacent meter 68. Therefore, the configuration of the cell voltage monitoring sub-system shown in FIG. 5 is similar to the cell voltage monitoring sub-system shown in FIG. 1, where the differential amplifiers are replaced with voltage meters.

If one of the cells is failing, the reading from a particular voltage meter 68 will go low providing an indication of same. However, if one of the wires becomes loose or breaks or the connection deteriorates, the output voltage of a particular voltage meter 68 will not change. For example, if the wire at location 70 breaks or otherwise fails so that plate 72 is not electrically coupled to voltage meters 74 and 76, then the current flowing through the voltage meter 76 will continue on through the voltage meter 74 and will not indicate that the wire has failed.

Figure 6:
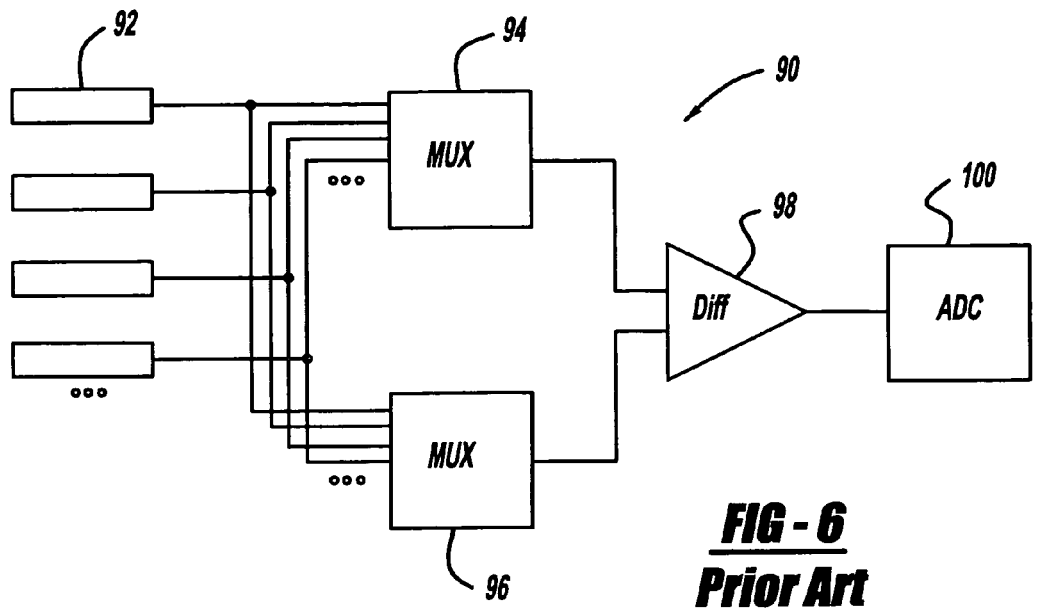
FIG. 6 is a plan view of a cell voltage unit for measuring the voltage potentials of a few cells in a fuel cell stack.

FIG. 6 is a schematic block diagram of a known cell voltage unit (CVU) 90 that measures the voltage potential of a plurality of fuel cells in a fuel cell stack represented by stack plates 92. In this embodiment, a first multiplexer 94 and a second multiplexer 96 are provided to selectively switch which of the fuel cells is being measured at any particular time to reduce system components. In one embodiment, the CVU 90 is able to measure the voltage potential of up to sixteen fuel cells. Particularly, all of the wires coupled to the plates 92 are electrically coupled to the inputs of both of the multiplexers 94 and 96. The multiplexers 94 and 96 are controlled so that the output of the multiplexer 94 is coupled to one of the plates 92 and the output of the multiplexer 96 is coupled to an adjacent plate so as to provide a voltage potential difference between the plates representing the voltage potential of the fuel cell. The output signals from the multiplexers 94 and 96 are applied to a differential amplifier 92 that provides a differential analog voltage potential signal that is converted to a digital signal by an analog-to-digital converter (ADC) 100. Therefore, because the differential amplifier 98 is only electrically coupled to two of the plates 92 at any given time, the output of the differential amplifier 98 can provide an indication of both a low producing fuel cell and a failing connection.

The multiplexers 94 and 96 and the differential amplifier 98 include small capacitances. When the multiplexers 94 and 96 output the voltage signals for opposing plates 92 of a fuel cell, and the fuel cell is failing, the charge stored on the capacitances in the multiplexers 94 and 96 and the differential amplifier 98 will dissipate, causing the voltage potential to be reduced indicating a failing cell. However, if a wire or connection fails or is failing, where it would have a high resistance, the capacitances in the multiplexers 94 and 96 and the differential amplifier 98 can not dissipate their charge fast enough when the CVU 90 is taking the reading from that cell. Therefore, the output of the ADC 100 may still indicate a normally operating cell when one of the connections has failed. As discussed herein, a failed plate connection can either be a broken wire, an increased contact resistance between a connector pin and the plate, or some other increased resistance to the plate. Therefore, this increased resistance will affect the voltage reading taken by the CVU 90. A failed pin connection can be the result of oxygen and water interacting at the connection.

Figure 7:
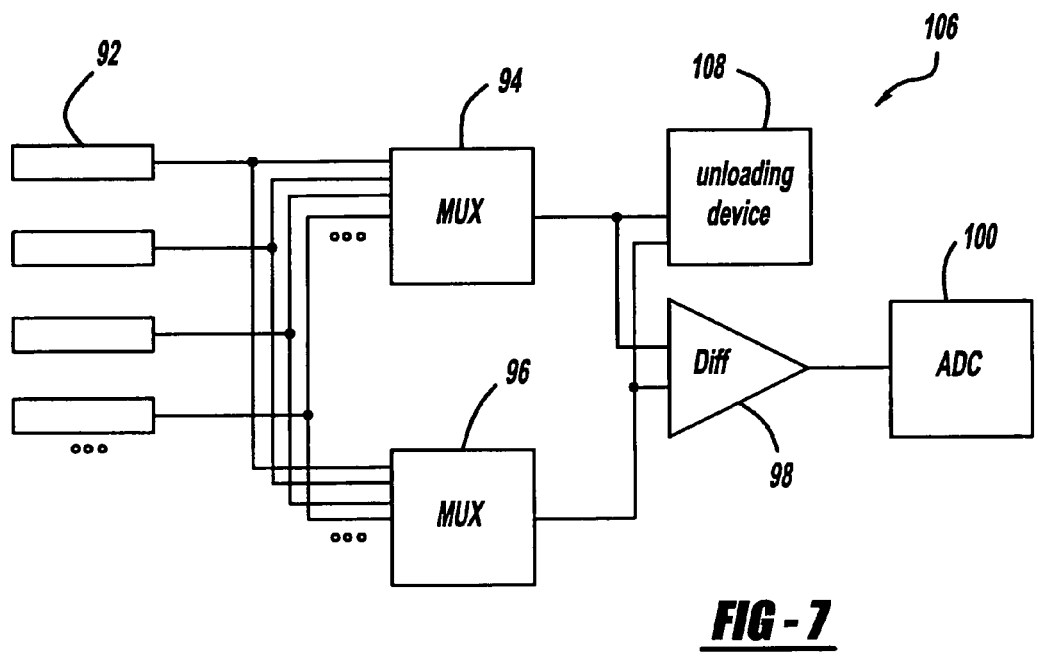
FIG. 7 is a plan view of the cell voltage unit shown in FIG. 6 including an unloading device for dissipating a capacitor in the differential amplifier, according to an embodiment of the present invention.

FIG. 7 is a schematic block diagram of a CVU 106 similar to the CVU 90, where like elements are identified by a same reference numeral, according to another embodiment of the present invention. In this embodiment, an unloading device 108 is electrically coupled across the inputs to the differential amplifier 98 and the outputs of the multiplexer 94 and 96. According to the invention, each time the multiplexers 94 and 96 have finished outputting the voltage signals for one fuel cell, the multiplexers 94 and 96 will be deactivated or switched off, and the unloading device 108 will be activated or switched off, and the unloading device 108 will be activated to short the inputs of the differential amplifier 98 and the outputs of the multiplexers 94 and 96, thus dissipating the differential voltage across the inputs of the differential amplifier 98 while leaving the capacitances charged with the fuel cell's common mode voltage. In one embodiment, the unloading device 108 includes a switch to provide the short circuit, however, other devices may be equally applicable.

The multiplexers 94 and 96 are then switched on and the unloading device 108 is deactivated so that the CVU 106 can then take the measurement for the next fuel cell. When the CVU 106 takes the measurement of adjacent fuel cells, the common mode voltage charge stored on the capacitances of the differential amplifier 98 and the multiplexers 94 and 96 will be dissipated through the plate connections. When one of the plate connections is broken, the common mode voltage will not be dissipated and the differential amplifier 98 will measure the difference between the plate voltage and the stored common mode voltage. When the broken plate connection is associated with the positive terminal of a fuel cell, the measured voltage will be negative. Conversely, when the broken connection is associated with the negative terminal of a fuel cell, the measured voltage will be approximately twice the cell voltage. The resulting output voltage signal from the ADC 100 will first be low or high, and then high or low. Because the multiplexers now output the true voltage signal for the fuel cells, an indication of a failed plate connection will show the pattern at location 58 in FIG. 3.

Figure 8A:
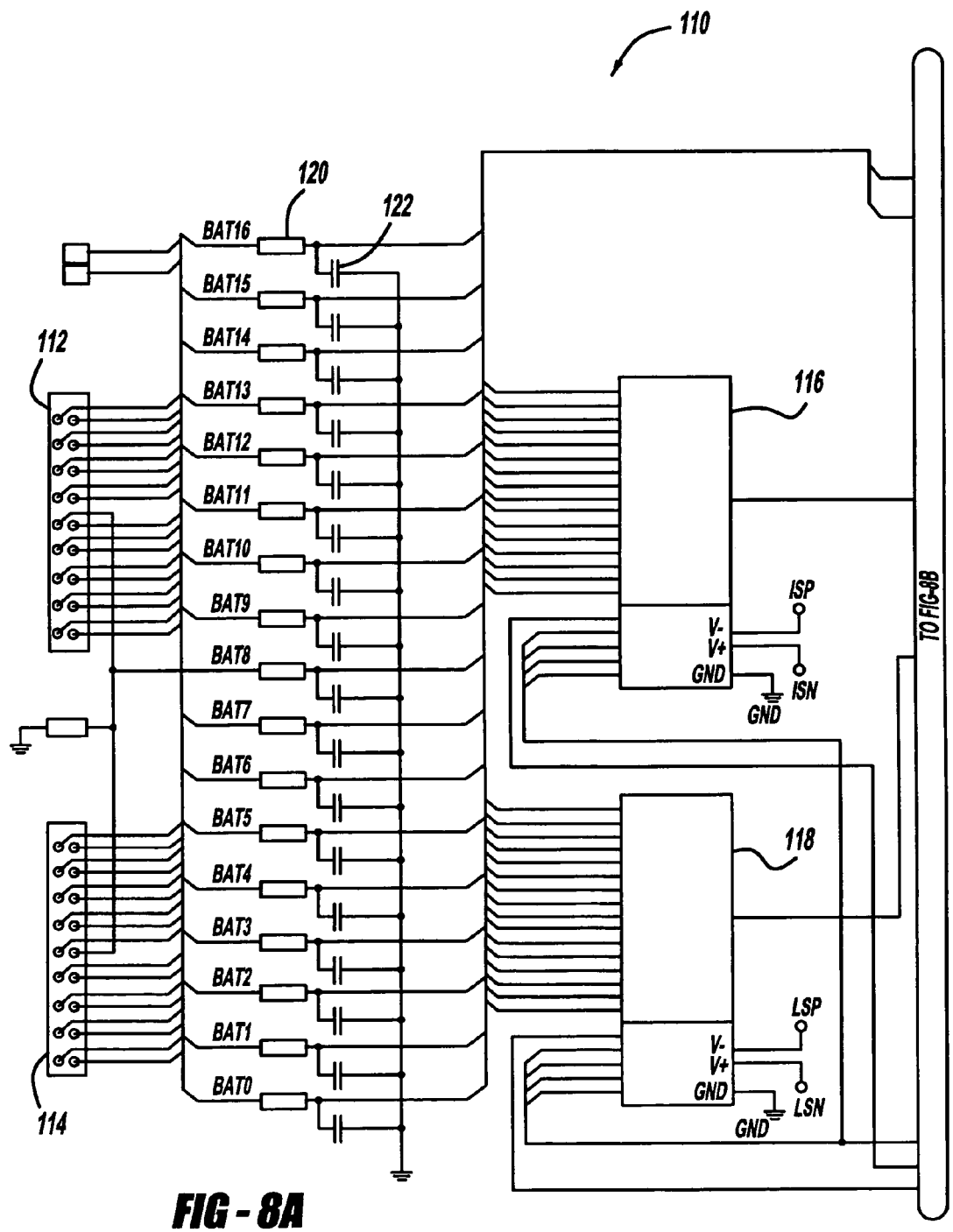

FIGS. 8A and 8B are schematic diagrams of a CVU 110 that incorporates the principals of the CVU 106. The CVU 110 includes two connectors 112 and 114 that are connected to a series of plates in fuel cell stack. In one embodiment, the connectors 112 and 114 are connected to the plates of sixteen adjacent fuel cells. The voltage signals from the connectors 112 and 114 are sent to multiplexers 116 and 118, representing the multiplexers 94 and 96, respectively. A series of resistances 120 and capacitors 122 are provided in the lines connecting the connectors 112 and 114 to the multiplexers 116 and 118 to provide filtering and noise reduction. The connection of the wires to the multiplexers 116 and 118 is such that when a certain pin on the multiplexers 116 and 118 is selected, the output of the multiplexer 116 is a voltage signal from one plate and the output of the multiplexer 118 is a voltage signal from an adjacent plate. The outputs of the multiplexers 116 and 118 are applied to a differential amplifier 126 representing the differential amplifier 98.

Likewise, an unloading device 128, representing the unloading device 108, is electrically coupled across the input lines to the differential amplifier 126 and the outputs of the multiplexers 116 and 118. In this embodiment, the unloading device 128 includes four switches 130, where two of the switches 130 are used to short the input lines to the differential amplifier 126. Two of the switches 130 are used for reduced resistance purposes. The other two switches 130 are used to switch the multiplexers 116 and 118 to another mode where the opposite positive or negative voltage signal from the fuel cell is taken first so that the switching of the multiplexers 116 and 118 can be reversed from 1 to 16 and then 16 to 1. The output of the differential amplifier 126 is sent through a filter 132 to an analog to digital converter 134 that provides the conversion. A voltage unit 136 provides a reference voltage.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack including a plurality of fuel cells defined by bipolar plates separated by membrane electrode assemblies; and
    a cell voltage monitoring sub-system including wires electrically coupled to each bipolar plate, said cell voltage monitoring sub-system further including a plurality of differential amplifiers where a wire coupled to one bipolar plate is electrically coupled to a positive input of one differential amplifier and a negative terminal of another differential amplifier, said cell voltage monitoring sub-system being configured to:
    determine if a wire connection has failed by measuring the voltage of each fuel cell in the fuel cell stack;
    determine if the measured cell voltage of one of the fuel cells is below a first predetermined voltage;
    determine if the measured cell voltage of an adjacent fuel cell to the one fuel cell is above a second predetermined voltage; and
    determine that a connection to a common bipolar plate between the two fuel cells has failed if the voltage of the one fuel cell is below the first predetermined voltage and the voltage of the adjacent fuel cell is above the second predetermined voltage.

2. The system according to claim 1 wherein the cell voltage monitoring sub-system determines that the one fuel cell has a low cell voltage if the cell voltage of the one fuel cell is below the first predetermined voltage and the cell voltage of the adjacent fuel cell is not above the second predetermined voltage.

3. The system according to claim 1 wherein the second predetermined voltage is a maximum stack voltage.

4. The system according to claim 1 wherein the cell voltage monitoring sub-system computes an average cell voltage from all of the cell voltages and computes a standard deviation of the average cell voltage.

5. The system according to claim 4 wherein the first predetermined voltage is about four times the standard deviation and the second predetermined voltage is about four times the standard deviation.

6. The system according to claim 1 wherein the fuel cell system is on a vehicle.

7. A fuel cell system comprising:
    a fuel cell stack including a plurality of fuel cells defined by bipolar plates separated by membrane electrode assemblies; and
    a cell voltage monitoring sub-system including wires electrically coupled to each bipolar plate, said cell voltage monitoring sub-system further including a first multiplexer and a second multiplexer each having an input coupled to the wires, said cell voltage monitoring sub-system further including a differential amplifier including a first input receiving a voltage signal from an output from the first multiplexer and a second input receiving a voltage signal from an output of the second multiplexer, wherein the first and second multiplexers are controlled so that an input of the first multiplexer provides a voltage signal from one of the bipolar plates in the stack and an input of the second multiplexer provides a voltage signal from an opposing bipolar plate in the fuel cell stack, said differential amplifier providing a differential output of the voltage signals, said cell voltage monitoring sub-system further including an unloading device for dissipating a capacitance in the differential amplifier between each time a voltage potential signal is provided by the first and second multiplexers.

8. The system according to claim 7 wherein the unloading device includes at least one switch for shorting the input to the differential amplifier and the outputs of the first and second multiplexers.

9. The system according to claim 7 wherein the at least one switch is two switches.

10. The system according to claim 7 wherein the cell voltage monitoring sub-system includes an analog-to-digital converter for inverting the analog output from the differential amplifier to a digital signal.

11. The system according to claim 7 wherein the cell voltage monitoring sub-system monitors the voltage of sixteen adjacent fuel cells in the fuel cell stack.

12. The system according to claim 7 wherein the cell voltage monitoring sub-system determines that the measured cell voltage of one of the fuel cells is below a first predetermined voltage, determines if the measured cell voltage of an adjacent fuel cell to the one fuel cell is above a second predetermined voltage, and determines that a connection to a common bipolar plate between the two fuel cells has failed if the voltage of the one fuel cell is below the first predetermined voltage and the voltage of the adjacent cell is above the second predetermined voltage.

13. The system according to claim 11 wherein the second predetermined voltage is a maximum stack voltage.

* * * * *